United States Patent
Kim et al.

(10) Patent No.: US 9,374,187 B2
(45) Date of Patent: Jun. 21, 2016

(54) DISTRIBUTED ANTENNA SYSTEM AND METHOD

(75) Inventors: Bung Chul Kim, Burbank, CA (US); Younghoon Ko, Burbank, CA (US)

(73) Assignee: ADVANCED RF TECHNOLOGIES, INC., Burbank, CA (US)

( * ) Notice: Subject to any disclaimer, the term of this patent is extended or adjusted under 35 U.S.C. 154(b) by 371 days.

(21) Appl. No.: 13/588,717

(22) Filed: Aug. 17, 2012

(65) Prior Publication Data

US 2013/0236180 A1    Sep. 12, 2013

Related U.S. Application Data

(60) Provisional application No. 61/609,585, filed on Mar. 12, 2012.

(51) Int. Cl.
| | |
|---|---|
| *H04J 14/00* | (2006.01) |
| *H04B 10/00* | (2013.01) |
| *H04J 14/02* | (2006.01) |
| *H04W 88/08* | (2009.01) |

(52) U.S. Cl.
CPC ............ *H04J 14/0236* (2013.01); *H04J 14/025* (2013.01); *H04J 14/0234* (2013.01); *H04J 14/0246* (2013.01); *H04J 14/0247* (2013.01); *H04J 14/0252* (2013.01); *H04J 14/0282* (2013.01); *H04W 88/085* (2013.01)

(58) Field of Classification Search
CPC ..................... H04B 10/2575; H04B 10/25754; H04J 14/0234; H04J 14/0236; H04J 14/0246
USPC .................................................. 398/72, 115
See application file for complete search history.

(56) References Cited

U.S. PATENT DOCUMENTS

| | | | | |
|---|---|---|---|---|
| 7,715,722 B1 * | 5/2010 | Hoke | ............... | H04B 10/25758 398/115 |
| 7,995,924 B2 * | 8/2011 | Lee | .................... | H04Q 11/0067 398/102 |
| 8,275,265 B2 * | 9/2012 | Kobyakov | ........ | H04B 10/25753 398/115 |
| 8,428,510 B2 * | 4/2013 | Stratford | .................. | H04B 3/48 455/7 |
| 8,548,330 B2 * | 10/2013 | Berlin | .............. | H04B 10/25753 340/2.22 |
| 8,570,914 B2 * | 10/2013 | Sauer | .................... | H04W 64/00 370/278 |
| 8,649,684 B2 * | 2/2014 | Casterline | ........ | H04B 10/25754 398/115 |
| 8,817,848 B2 * | 8/2014 | Lemson | ........... | H04B 10/25753 370/279 |
| 2004/0264400 A1 * | 12/2004 | Lee | ...................... | H04J 14/0226 370/319 |
| 2010/0290787 A1 * | 11/2010 | Cox | ...................... | H04B 10/808 398/115 |
| 2011/0268446 A1 * | 11/2011 | Cune | ................ | H04B 10/25753 398/79 |
| 2011/0268449 A1 * | 11/2011 | Berlin | .............. | H04B 10/25753 398/115 |
| 2012/0134666 A1 * | 5/2012 | Casterline | ........ | H04B 10/25754 398/22 |
| 2012/0148245 A1 * | 6/2012 | Bowler | ................... | H04J 14/02 398/58 |
| 2013/0089336 A1 * | 4/2013 | Dahlfort | ............. | H04J 14/0282 398/115 |
| 2014/0112667 A1 * | 4/2014 | Neukirch | ......... | H04B 10/25752 398/115 |
| 2014/0212144 A1 * | 7/2014 | Berlin | .................... | H04B 7/022 398/115 |

* cited by examiner

*Primary Examiner* — Ken N Vanderpuye
*Assistant Examiner* — Abbas H Alagheband
(74) *Attorney, Agent, or Firm* — Lewis Roca Rothgerber Christie LLP (57) ABSTRACT

A distributed antenna system includes a plurality of remote units configured to service different regions of a service area, and a head-end unit configured to process and transmit downlink signals from base stations to the remote units over optical cables, and to process and transmit uplink signals from the remote units to the base stations, wherein the remote units are configured to adjust or filter a level of downlink signals from the head-end unit and to transmit the adjusted or filtered downlink signals to mobile stations, and to process and transmit uplink signals from mobile stations to the head-end unit over the optical cables.

16 Claims, 8 Drawing Sheets

Figure 1

PRIOR ART

Figure 2

PRIOR ART

DISTRIBUTED ANTENNA SYSTEM AND METHOD

CROSS-REFERENCE TO RELATED APPLICATION(S)

The present application claims priority to and the benefit of U.S. Provisional Patent Application Ser. No. 61/609,585, filed Mar. 12, 2012, the contents of which are hereby incorporated by reference in their entirety.

BACKGROUND

1. Field

Embodiments of the invention are directed generally to a distributed antenna system (DAS) and method for supporting multi-sector and/or multiple-input and multiple-output (MIMO) systems. More specifically, embodiments of the invention are directed to a DAS for supporting multi-sector and/or MIMO systems with a reduced number of optical fibers utilizing wavelength division multiplexing (WDM), and in particular dense wavelength division multiplexing (DWDM), and a method of implementing such a DAS.

2. Description of Related Art

Distributed antenna systems (DAS) are generally used to expand wireless coverage in settings such as buildings, campuses, stadiums, hospitals, tunnels, and the like, where there may be shadow regions or areas with reduced signal strength. A DAS generally includes a number of head-end units (HUs) that interface with one or more base stations (BTS) and a plurality of remote units (RUs) that are distributed throughout a given service area to provide coverage in the service area. The DAS is used to amplify the signal strength to improve coverage, particularly in the shadow regions or areas with reduced signal strength.

Figure 1:
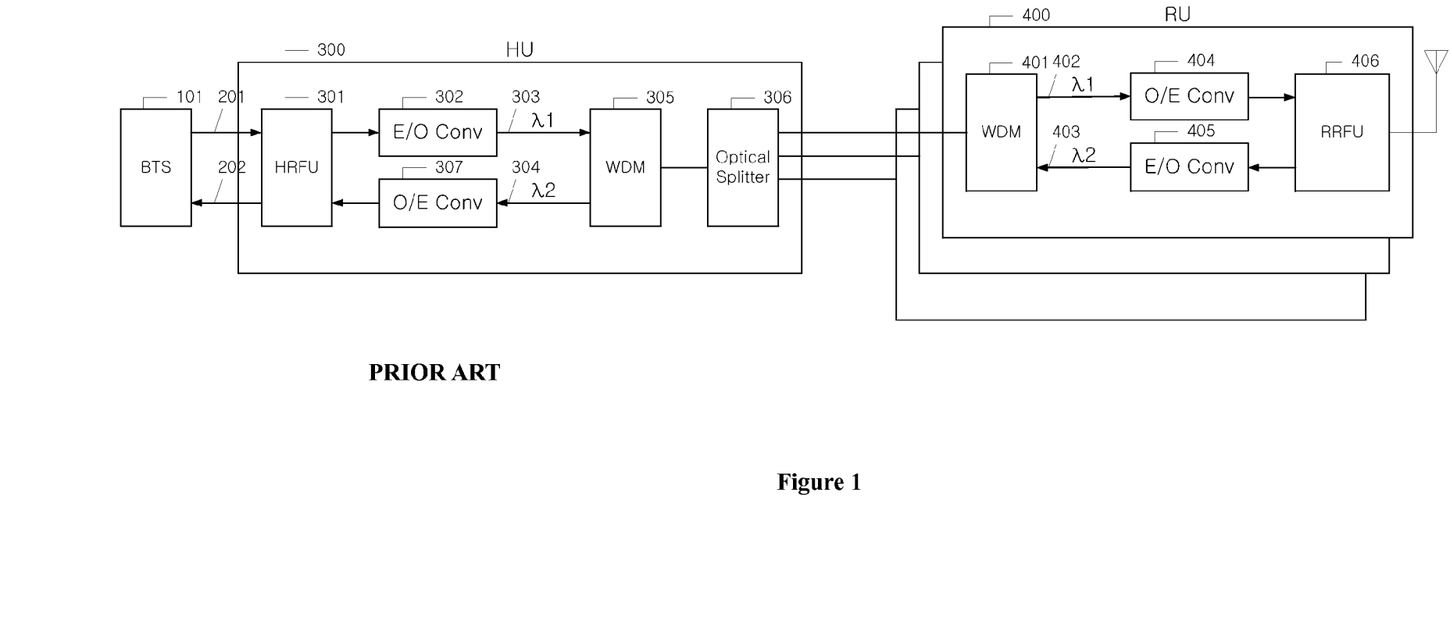
FIG. 1 illustrates a block diagram of a typical analog optical distributed antenna system.

FIG. 1 illustrates a block diagram of a general analog optical DAS. The optical DAS in FIG. 1 includes a base station (BTS) 101, a head-end unit (HU) 300, and a plurality of remote units (RUs) 400, the latter of which are distributed in different regions of a specified service area. The HU 300 interfaces with the BTS 101 and the RUs 400 through fiber optic lines or cables connected to the HU 300.

The head-end unit 300 includes a head-end RF unit (HRFU) 301, an electrical-to-optical (E/O) converter 302, an optical-to-electrical (O/E) converter 307, a wavelength division multiplexer (WDM) 305, and an optical splitter 306.

The HRFU 301 adjusts the level of a downlink signal 201 received from the BTS 101 to a suitable level and transfers the signal to a number of distributed RUs 400. The HRFU 301 also adjusts the level of an uplink signal received from the OLE converter 307 to a suitable level and transfers the signal 202 back to the BTS 101.

The E/O converter 302 transforms or converts a downlink RF signal into a downlink optical signal 303, where the downlink optical signal 303 may have a different wavelength for each E/O converter 302.

The O/E converter 307 transforms or converts an uplink optical signal 304 into an uplink RF signal. Different O/E converters 307 may utilize optical signals 304 with different wavelengths. In this manner, the HU 300 may both convert a downlink RF signal into a downlink optical signal, and may also convert an uplink optical signal to an uplink RF signal.

The wavelength division multiplexer (WDM) 305 combines a plurality of optical signals with different wavelengths received from one or more E/O converters into a combined optical signal with multiple wavelengths. The WDM 305 also splits combined optical signals with multiple wavelengths received from a single optical cable into a plurality of separate optical signals transmitted through different optical paths based on the different wavelengths.

The optical splitter 306 splits an optical signal with multiple wavelengths from an optical cable connected to the WDM 305 into a plurality of optical signals with multiple wavelengths, transmits the split or divided optical signals with multiple wavelengths through a plurality of optical cables to different remote units 400. The optical splitter 306 also combines optical signals with multiple wavelengths from the RUs 400 through a plurality of optical cables into a combined optical signal with multiple wavelengths and transmits the combined optical signal through a single optical cable to the WDM 305.

Each of the remote units 400 includes a wavelength density multiplexer (WDM) 401, an optical-to-electrical (O/E) converter 404, an electrical-to-optical (E/O) converter 405, and a remote RF unit (RRFU) 406.

The wavelength division multiplexer (WDM) 401 splits a combined optical signal with multiple wavelengths received from a single optical cable into a plurality of separate optical signals transmitted through different optical paths based on the different wavelengths. The WDM 401 also combines a plurality of optical signals with different wavelengths received from the E/O converter 405 into a combined optical signal with multiple wavelengths.

The O/E converter 404 transforms or converts a downlink optical signal 402 into a downlink RF signal. The downlink optical signal 402 may have a different wavelength for each O/E converter 404. Meanwhile, the E/O converter 405 transforms an uplink RF signal into an uplink optical signal 403, where each uplink optical signal may have a different wavelength based on the E/O converter 405.

The remote RF unit (RRFU) 406 adjusts the level of the downlink signal received from the O/E converter 404 to provide proper coverage for a particular area, and monitors the level of uplink signals received from multiple mobile stations (MSs) in the designated service area, and adjusts the signals to optimize the signal levels for the MSs. The RRFU 406 also filters out-band spurious signals, for example, via a duplexer filter.

Meanwhile, in some settings such as campuses and stadiums, traffic loads for voice or data calls may vary or fluctuate more greatly during peak usage times based on the time of day. Due to the wide service areas of such settings, and various other factors such as multiple building structures and the number of users in the service area or other predefined area, sometimes multiple sectorization of such settings, where the service area is divided into multiple sectors, is desirable to support sufficient wireless coverage and throughputs. Typically, each such sector is connected to separate base stations with separate capacities.

Figure 2:
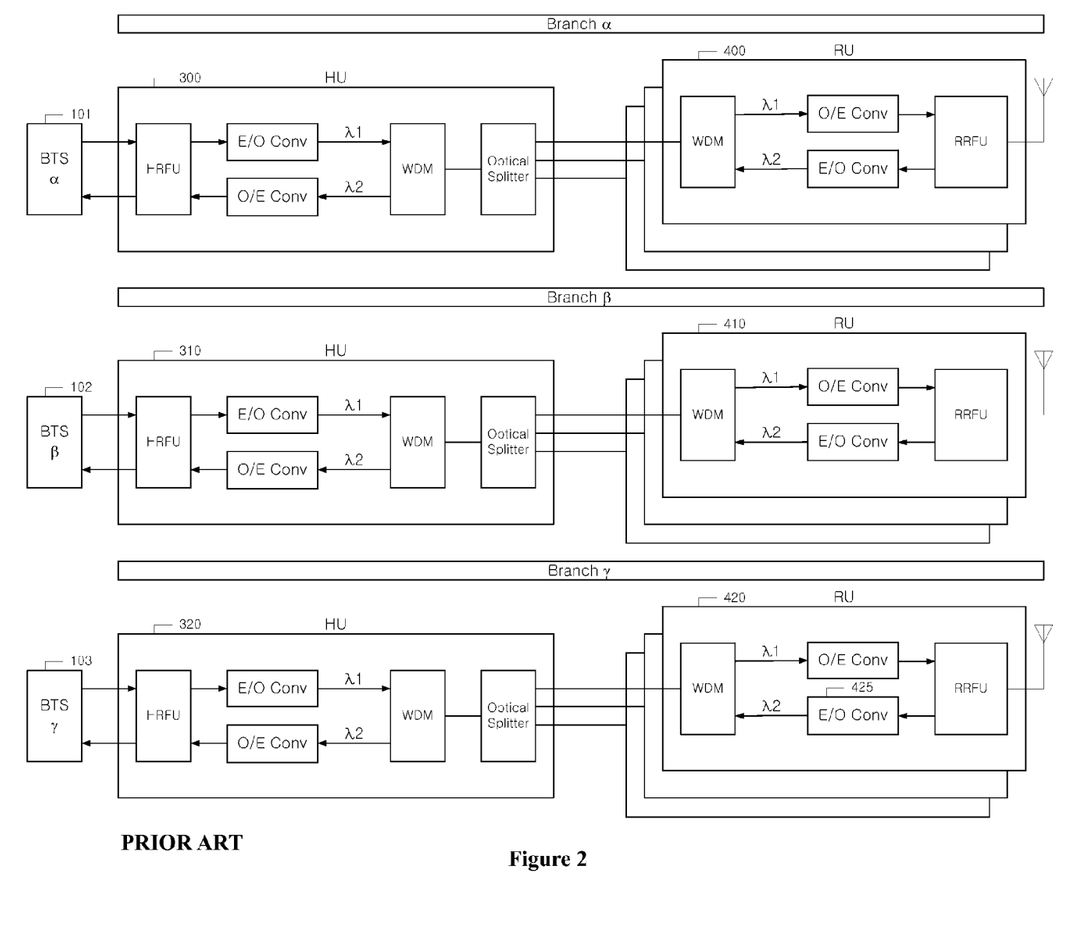
FIG. 2 illustrates a block diagram of a typical distributed antenna system supporting three separate sectors.

FIG. 2 is a block diagram illustrating a general distributed antenna system (DAS) which supports multiple sectors. As seen in FIG. 2, each head unit (HU) 300, 310, 320 is respectively connected to a separate sectorized base station (BTS) 101, 102, 103, as well as its own plurality of sectorized remote units (RUs) 400, 410, 420. Each separate sector is arranged similarly to the DAS illustrated in FIG. 1, and the descriptions of similar parts will therefore be omitted.

As can be seen in FIG. 2, as there is no cross-communication between the separate sectors of FIG. 2, the infrastructure does not support adjusting the traffic loads between the sectors, and therefore, when the traffic at one sector exceeds a bandwidth allotment or capacity within that sector, voice calls and/or data communication in that sector suffer. If the traffic loads in a particular section exceed the capacity supported by an associated sectorized BTS, the RUs connected to that particular BTS will not be able to support the excess traffic unless the capacity of that sectorized BTS is increased. Meanwhile, capacity in the other sectors may be lower, and bandwidth at the other sectorized BTSs may remain unused and underutilized.

Figure 3:
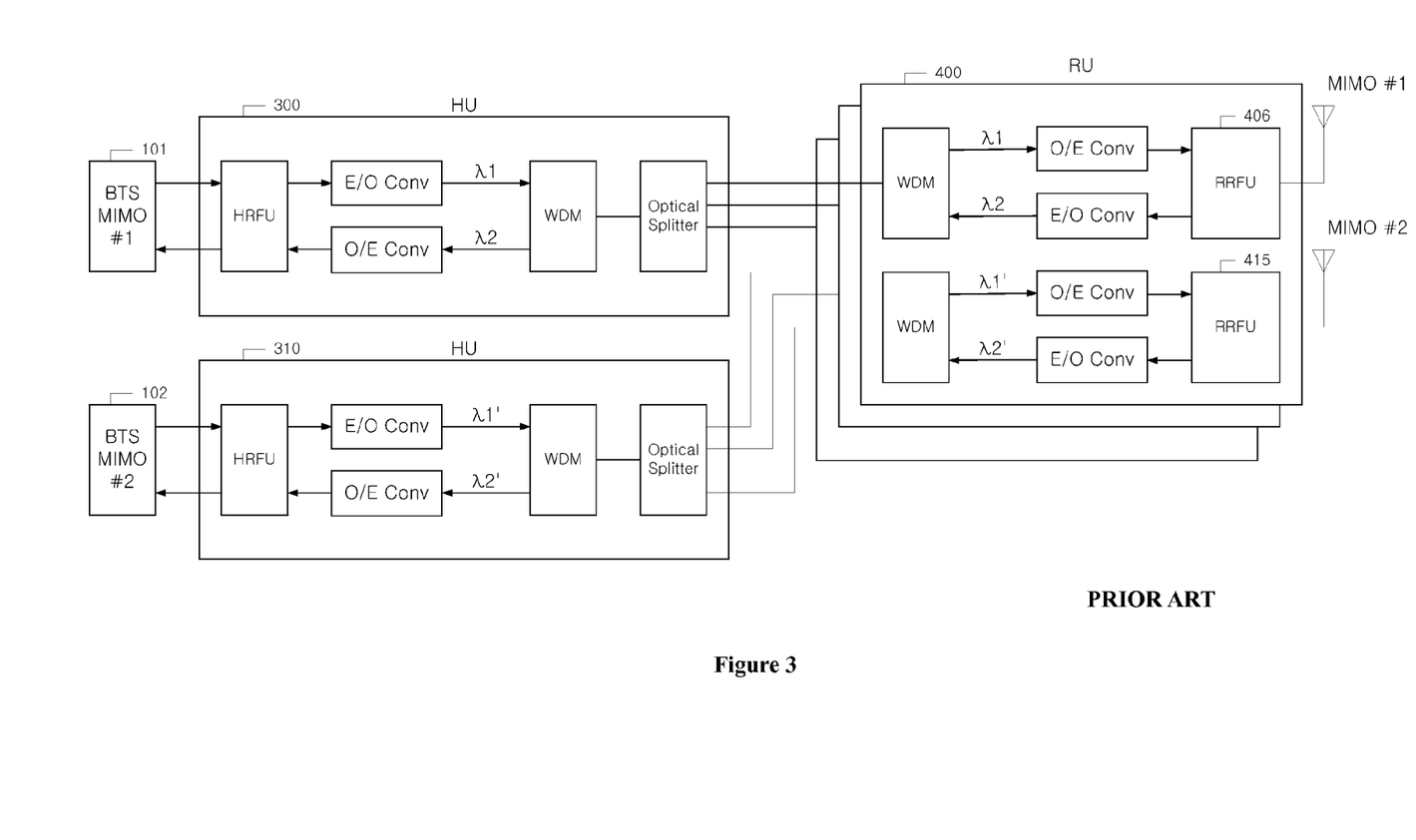
FIG. 3 illustrates a block diagram of a typical distributed antenna system supporting a two-transmitter and two-receiver multiple-input and multiple-output structure.

FIG. 3 illustrates a block diagram of a general optical distributed antenna system (DAS) which is configured to support multiple-input and multiple-output (MIMO) systems. The head-end units (HUs) and the remote units (RUs) are configured similarly to those in FIGS. 1 and 2, and therefore, the descriptions of similar parts will be omitted.

The DAS in FIG. 3 allows for sharing of bandwidth or capacity between the different BTSs 101, 102. However, in these systems, for the DAS to share bandwidth between the BTSs, the DAS requires separate optical cables to be routed between each HU and each RU. For example, in FIG. 3, a 2×2 MIMO DAS which includes two HUs 300, 310, and two remote RF units (RRFUs) 406, 415 per RU 400, requires two optical cables to be separately routed from each of the two HUs 300, 310 to the separate RRFUs 406, 415, respectively, in each RU 400. In this manner, a general DAS provides two separate and distinct RF paths to support a 2×2 MIMO architecture. Therefore, in a general DAS supporting 2×2 MIMO, two optical cables must be routed to each RU 400, while in a 4×4 MIMO DAS, four optical cables must be routed to each RU 400. As such, with larger systems, such an arrangement would become prohibitive. For example, larger systems will require increased expenses for multiple optical cable installation and maintenance.

SUMMARY

The invention provides a system and method for supporting a dynamic sectorization structure of a distributed antenna system (DAS) and for transferring multiple sectorized signals or multiple-input and multiple-output (MIMO) signals to improve or optimize signal distribution within the system, while reducing the number of optical fibers required. In this context, dynamic sectorization describes a system in which the bandwidth or capacity of a sectorized base station (BTS) can be dynamically shared with the bandwidths or capacities of other BTSs within the system, based on the usage distribution within the system.

According to one embodiment, a distributed antenna system includes a plurality of remote units configured to service different regions of a service area, and a head-end unit configured to process and transmit downlink signals from base stations to the remote units over optical cables, and to process and transmit uplink signals from the remote units to the base stations, wherein the remote units are configured to adjust or filter a level of downlink signals from the head-end unit and to transmit the adjusted or filtered downlink signals to mobile stations, and to process and transmit uplink signals from mobile stations to the head-end unit over the optical cables.

BRIEF DESCRIPTION OF THE DRAWINGS

Further features and aspects of the invention will become apparent from the description of various exemplary embodiments, illustrated in the accompanying drawings. In the drawings.

DETAILED DESCRIPTION

The present invention will be described more fully hereinafter, in which exemplary embodiments are presented, with reference to the accompanying drawings. As those skilled in the art will recognize, the described embodiments may be modified in various different ways without departing from the spirit or scope of the present invention. As such, the drawings and accompanying descriptions are to be regarded as illustrative in nature, and not restrictive.

In the following exemplary embodiments, elements having the same or similar configurations may be described in a first exemplary embodiment, while later exemplary embodiments may not include the similar descriptions, and may focus on and more specifically describe differences between the embodiment and previously described embodiments.

In addition, a "downlink" path or signal label will generally refer to a path or signal transmitted from a base station towards a remote unit, while an "uplink" path or signal label will generally refer to a path or signal transmitted from a remote unit back towards a base station.

Figure 4:
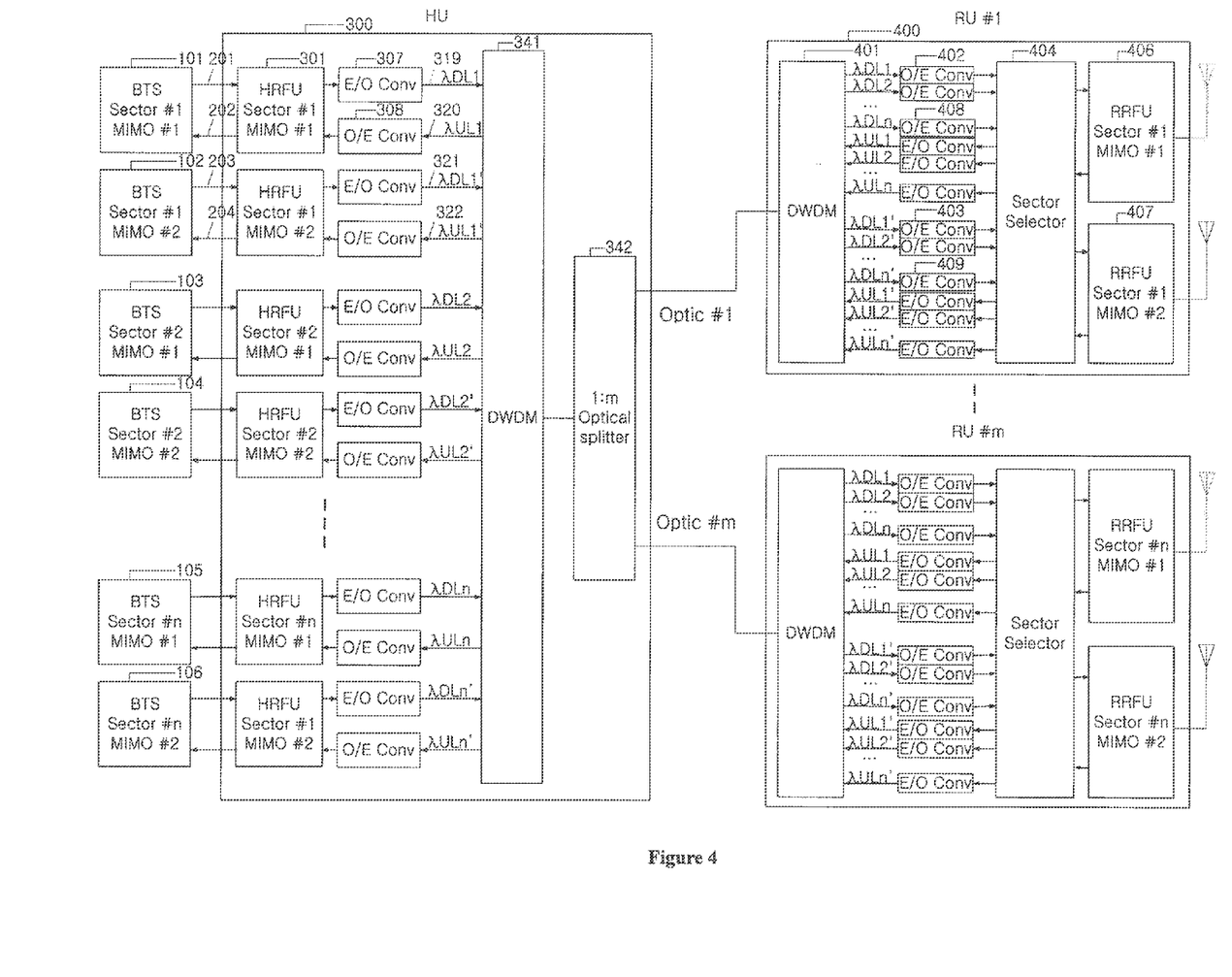
FIG. 4 illustrates a block diagram of a distributed antenna system supporting a multi-sector and multiple-input and multiple-output structure according to an embodiment of the invention.

A first exemplary embodiment of the invention will be described with reference to FIG. 4. FIG. 4 illustrates a block diagram of a distributed antenna system supporting a multi-sector and multiple-input and multiple-output structure according to an embodiment of the invention.

The embodiment of FIG. 4 can be implemented with a distributed antenna system (DAS) architecture which utilizes dense wavelength division multiplexers (DWDMs) and sector selectors. In such an embodiment, multiple sectorized signals or multiple-input and multiple-output (MIMO) signals may be combined by a DWDM and transmitted over a combined optical fiber, while a sector selector may dynamically select a desired sectorized signal from among multiple available sectorized signals.

The DAS of FIG. 4 includes a head-end unit (HU) 300 connected to a plurality of base stations or bi-directional amplifiers (BDAs, not shown in FIG. 4), and a plurality of remote units (RUs) 400, which are distributed within a desired service area.

In a representative downlink path in FIG. 4, in the HU 300, a head-end RF unit (HRFU) 301 adjusts a level of a downlink signal received from a corresponding sectorized BTS (e.g., 101, 102, 103, . . . , 106, etc.) to be utilized by a number of distributed RUs 400. An E/O converter 307 transforms a sectorized downlink RF signal into a downlink optical signal, with a separate wavelength utilized for each E/O converter. A dense wavelength division multiplexer (DWDM) 341 combines a plurality of optical signals with various different wavelengths, into a combined optical signal with multiple wavelengths to be transmitted through one or more optical cables. An optical splitter 342 connected to the DWDM 341 splits the combined optical signal with multiple wavelengths into a plurality of optical signals with different wavelengths, and transmits the signals through a plurality of optical cables to different distributed RUs 400.

Meanwhile, in each of the RUs 400, another DWDM 401 splits a combined optical signal having multiple wavelengths received from the HU 300 into a plurality of optical paths with a separate wavelength for each path. An O/E converter (e.g., 402, 403) for each path transforms or converts the downlink optical signal from the DWDM 401 into a downlink RF signal and transmits the downlink RF signal to a sector selector 404. The sector selector 404 then dynamically selects one or more desired sectorized signals from the various O/E converters and transmits them to associated remote RF units (RRFUs) 406, 407, based on the needs or requirements of the RRFUs 406, 407. The RRFUs 406, 407 monitor and adjust the level of the downlink signal received from the sector selector 404 to obtain a desired bandwidth or capacity allotment based on, for example, usage in an area covered by the RRFUs at a given time. The RRFUs 406, 407 may also filter out-band spurious signals, for example, via a duplexer filter.

In a representative uplink path in FIG. 4, in each of the RUs 400, the RRFUs 406, 407 monitor the levels of the uplink signals received from multiple mobile stations (MSs, not shown in FIG. 4), and adjust the levels of the signals to be transferred to the HU 300. The sector selector 404 assigns the uplink signal received from an RRFU 406, 407, to a path corresponding to a selected sector from among the various different sectors. An E/O converter (e.g., 408, 409) transforms or converts an uplink RF signal into an uplink optical signal, where each E/O converter converts the RF signal to an optical signal having a different wavelength. The DWDM 401 combines the plurality of optical signals with different wavelengths received from each of the E/O converters into a combined optical signal with multiple wavelengths, and transmits the combined optical signal through one or more optical cables.

Then, in the HU 300, the optical splitter 342 combines a plurality of signals received from the various RUs 400, and transmits the overall combined signal through an optical cable to the DWDM 341. The DWDM 341 splits the combined optical signal with multiple wavelengths into separate signals according to the signal wavelengths, and transmits the separated signals into a plurality of optical paths, with a different wavelength signal transmitted through each path. Each O/E converter (e.g., O/E converter 308) then transforms an uplink optical signal into an uplink RF signal. Finally, an associated HRFU 301 receives the signal from its corresponding O/E converter, and adjusts the level of the uplink signal received from the O/E converter to be transmitted to its associated BTS.

Figure 5:
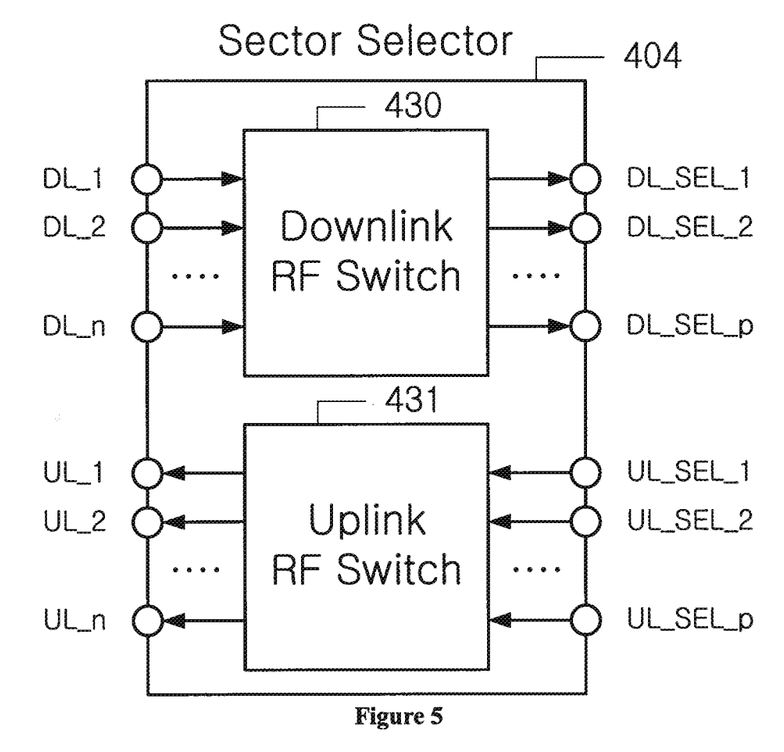
FIG. 5 illustrates a block diagram of a sector selector in FIG. 4.

FIG. 5 illustrates a block diagram of a sector selector, for example, the sector selector 404 of the embodiment of FIG. 4. The sector selector in FIG. 5 includes a downlink RF switch 430 and an uplink RF switch 431.

In the MIMO structure, the downlink RF switch 430 selects downlink RF signals, for example, signals DL_SEL_1, DL_SEL_2, . . . DL_SEL_p, from multiple sectorized downlink RF signals, for example, signals DL_1, DL_2, . . . DL_n, where a value of "n" is greater than or equal to a value of "p." The value "p" depends on the specifics of the particular MEMO structure, where for example, p is equal to 2 for a 2×2 MIMO system, and equal to 4 for a 4×4 MIMO system.

Meanwhile, in the MIMO structure, the uplink RF switch 431 switches uplink RF signals, for example, signals UL_SEL_1, UL_SEL_2, . . . UL_SEL_p, to paths corresponding to a selected sector from among the various sectorized uplink RF signals, for example, signals UL_1, UL_2, . . . , UL_n.

Figure 6:
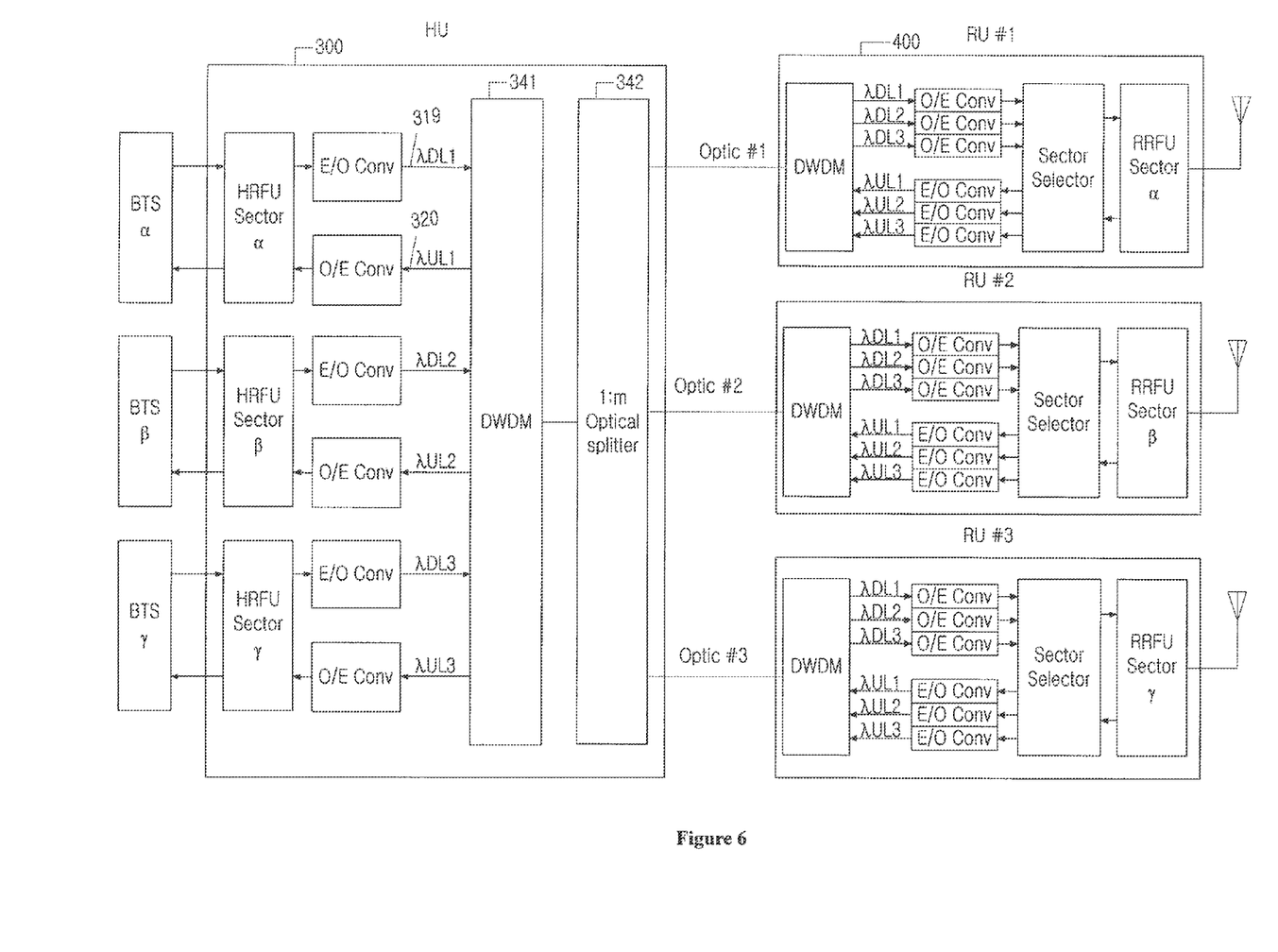
FIG. 6 illustrates a block diagram of a distributed antenna system supporting three sectors according to another embodiment of the invention.

FIG. 6 illustrates a block diagram of a distributed antenna system (DAS) supporting three sectors according to another embodiment of the invention.

In FIG. 6, the sectorized downlink/uplink signal for each sector may be converted into an optical signal 319 with a separate wavelength. The optical signals received from each E/O converter may then be combined by the DWDM 341, and the combined signal from the DWDM 341 can be transferred to various distributed RUs 400 after being split by the optical splitter 342, based on the needs or requirements of each of the RUs 400.

Here, each of the RUs 400 receives multiple sectorized signals from the HU 300, and the sector selector 404 in each of the RUs 400 selects the downlink signals corresponding to a selected sector from among the three available sectors. In addition, the sector selector 404 in each of the RUs 400 routes the uplink signals received from the RRFUs associated with the RU to specific paths corresponding to one or more of the three available sectors.

The DAS of FIG. 6 differs from that of FIG. 2 in that the DAS of FIG. 2, while supporting multiple sectors, cannot dynamically share bandwidth or capacity between the sectors during operation, since each of the RUs in FIG. 2 is independently connected or fixed with a particular sector and BTS. Meanwhile, in the DAS of FIG. 6, dynamic sectorization is made possible because the bandwidth or capacity of each BTS can be shared or transferred to any of the RUs in the system using the sector selectors. Therefore, utilization of the bandwidth or capacity of each of the BTSs can be improved or maximized across the system, while multiple sectorized signals or MIMO signals can be transferred or transmitted over a reduced number of optical fibers, as little as a single optical fiber in some embodiments, by utilizing the DWDMs. Such an embodiment can be applied to DAS systems supporting MIMO or sectorization configurations.

Figure 7:
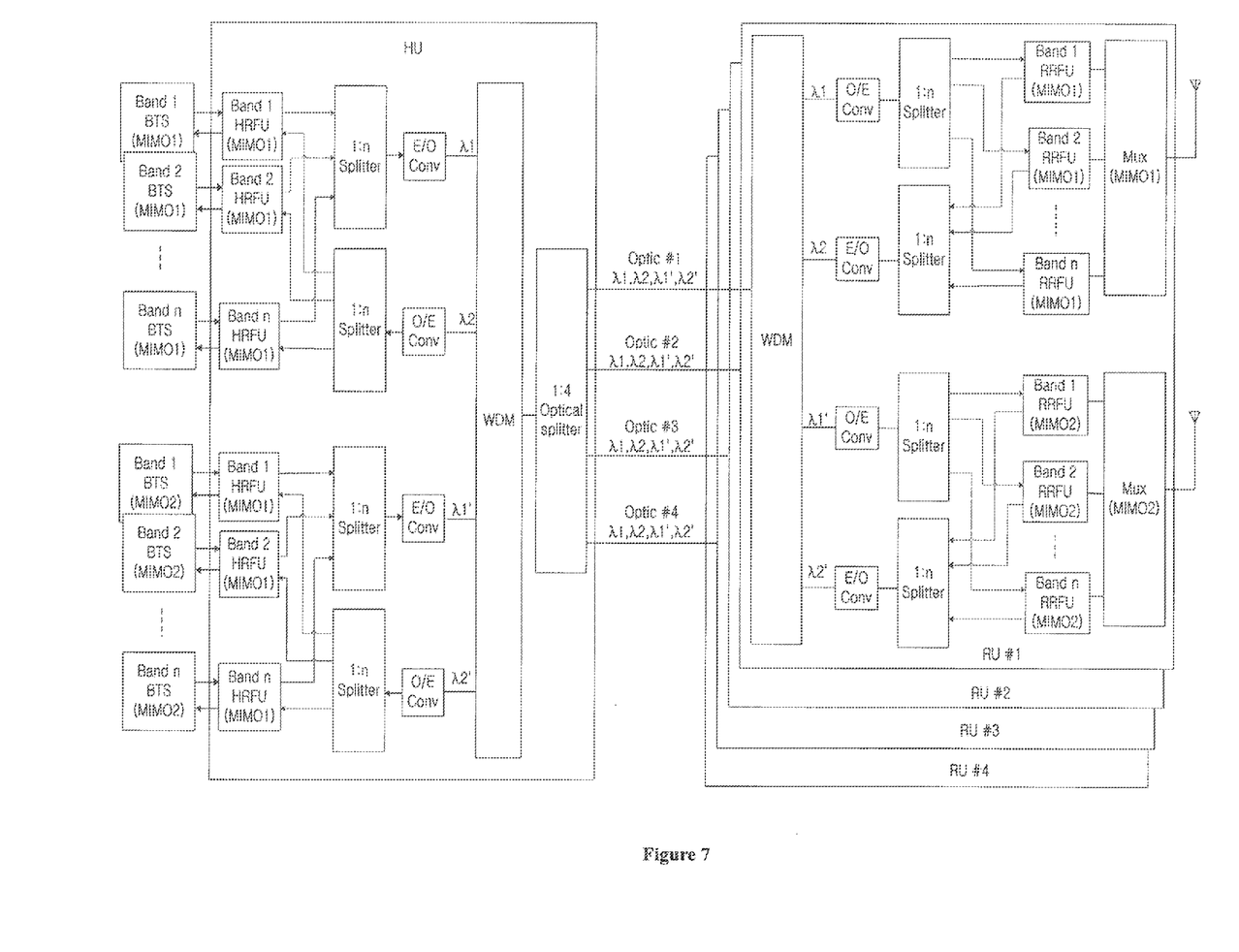
FIG. 7 illustrates a block diagram of a proposed distributed antenna system supporting a two-transmitter and two-receiver multiple-input and multiple-output structure for multiple bands according to still another embodiment of the invention.
Figure 8:
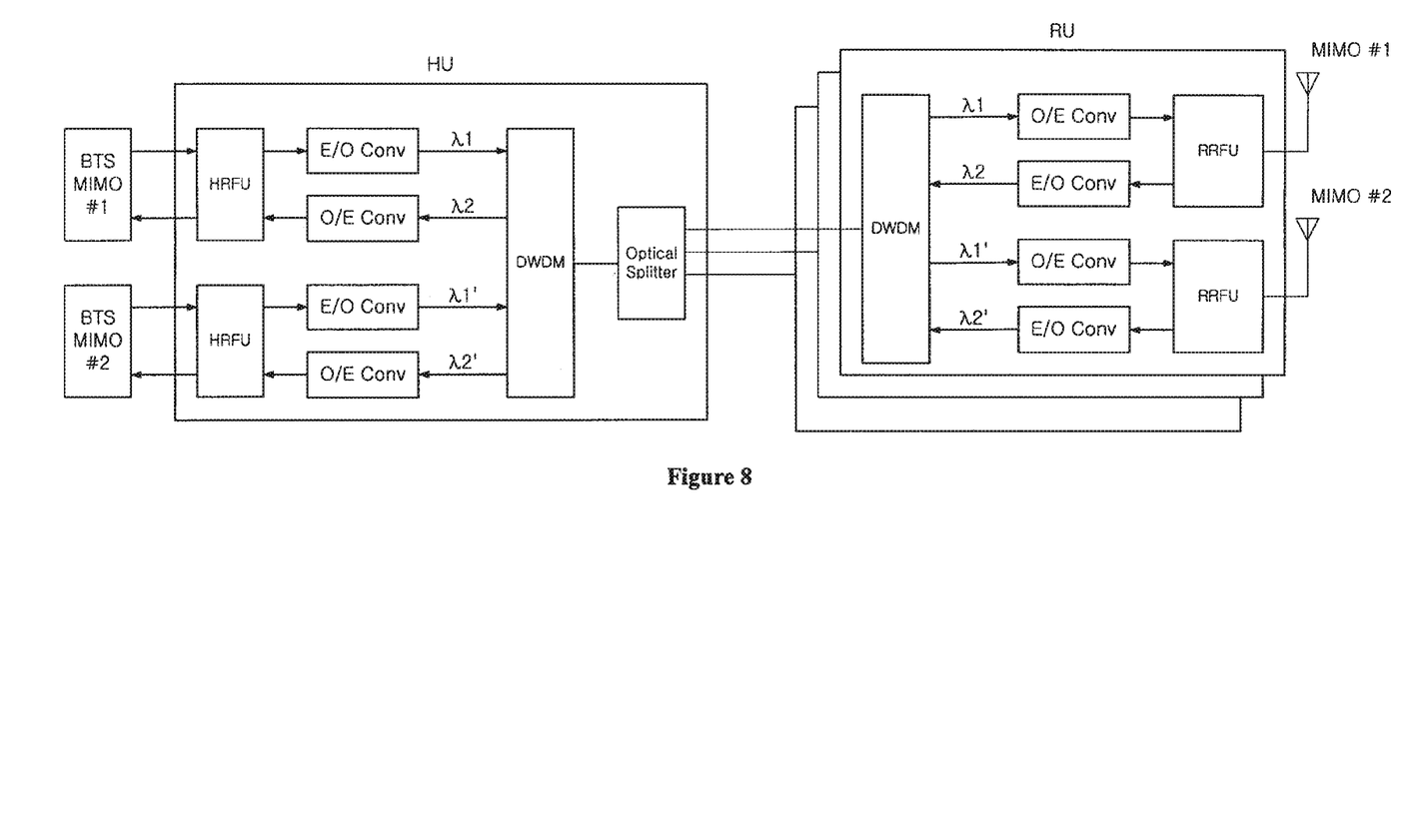
FIG. 8 illustrates a block diagram of a proposed distributed antenna system supporting a two-transmitter and two-receiver multiple-input and multiple-output structure for a single band according to yet another embodiment of the invention.

FIG. 7 illustrates a block diagram of a proposed distributed antenna system supporting a two-transmitter and two-receiver multiple-input and multiple-output structure for multiple bands according to an embodiment of the invention. FIG. 8 illustrates a block diagram of a proposed distributed antenna system supporting a two-transmitter and two-receiver multiple-input and multiple-output structure for a single band according to another embodiment of the invention.

Referring back to the system in FIG. 3, a typical DAS system requires routing of a large number of optical cables between each HU and each RU in order to share bandwidth or capacity between different BTSs. However, unlike in the system of FIG. 3, the DAS systems in FIGS. 7 and 8 can transmit multiple sectorized signals or maim signals over a reduced number of optical cables, over a single optical cable in some embodiments, by utilizing DWDMs. In this manner, one can reduce or minimize the number of optical cables needed to implement the system, and therefore expenses associated with, for example, additional optical cables and additional maintenance can also be reduced or minimized. In some systems, for example, systems in which a smaller number of wavelengths may be utilized, different wavelength division multiplexers, such as coarse wavelength division multiplexers (CWDM), can be used instead of DWDMs in order to further reduce costs.

DAS structures according to embodiments of the invention can support various different technologies and frequencies used in various different countries and regions around the world. For example, some supported frequencies may be VHF, UHF, and for example, any other frequencies between 698 MHz to 2.7 GHz, which covers various frequencies used for commercial wireless communications. Supported technologies for which embodiments of the invention may be applied may include, for example, public safety communication systems, paging systems, health care communication systems, GSM, LTE, CDMA, GPRS, EDGE, UMTS, IDEN, SMR, and WIMAX, among others.

According to embodiments of the invention, a system and method are provided to support the dynamic sectorization of a DAS and for transmitting multiple sectorized signals or MIMO signals over a reduced number of optical fibers. Dynamic sectorization allows the sharing of bandwidth or capacity between different sectorized BTSs with one another. In this manner, in these embodiments, signal strength and capacity can be boosted in areas within a DAS in which additional bandwidth or capacity may be needed due to high traffic and/or usage.

If such DAS infrastructures are incorporated in settings such as stadiums or campuses or other areas in which multi-sectorization may be desirable, the DAS can increase or maximize the utilization of a limited amount of BTS capacity by dynamically distributing the bandwidth or capacity of separate BTS units with one or more sector selectors. In addition, due to the reduced number of optical cables needed through the utilization of DWDMs, expenses associated with installation and/or maintenance can also be minimized or reduced.

While this invention has been described in connection with what is presently considered to be practical exemplary embodiments, it is to be understood that the invention is not limited to the disclosed embodiments, but is instead intended to cover various modifications and equivalent arrangements.

What is claimed is:

1. A distributed antenna system comprising:
   a plurality of remote units configured to service different regions of a service area; and
   a head-end unit configured to process and transmit downlink signals from base stations to the remote units over optical cables, and to process and transmit uplink signals from the remote units to the base stations;
   wherein the remote units are configured to adjust or filter a level of downlink signals from the head-end unit and to transmit the adjusted or filtered downlink signals to mobile stations, and to process and transmit uplink signals from mobile stations to the head-end unit over the optical cables;
   wherein the head-end unit comprises:
      a plurality of head-end RF units each configured to adjust or filter the downlink signals from at least one base station and to output corresponding downlink RF signals, and to adjust or filter the uplink signals from corresponding ones of the remote units;
      a plurality of E/O converters each configured to convert the downlink RF signals from a corresponding head-end RF unit into a downlink optical signal, wherein the downlink optical signals from a first one of the E/O converters has a different wavelength than the downlink optical signals from a second one of the E/O converters;
      a wavelength division multiplexer configured to combine a plurality of downlink optical signals with different wavelengths from the E/O converters into a combined downlink optical signal with multiple wavelengths, and to split a combined uplink optical signal with multiple wavelengths into a plurality of uplink optical signals with different wavelengths and transmit the uplink optical signals with different wavelengths to a plurality of optical paths according to the different wavelengths;
      an optical splitter configured to split the combined downlink optical signal into a plurality of downlink optical signals each having multiple wavelengths to the remote units via a corresponding optical cable for each remote unit, and to combine a plurality of uplink optical signals each having multiple wavelengths from the remote units into the combined uplink optical signal with multiple wavelengths; and
      a plurality of O/E converters each configured to convert uplink optical signals from the wavelength division multiplexer via a corresponding one of the optical paths into an uplink RF signal, wherein the uplink optical signals received by a first one of the O/E converters has a different wavelength than the uplink optical signals received by a second one of the O/E converters; and
   wherein at least one of the remote units comprises a plurality of O/E converters, at least one remote RF unit, a plurality of E/O converters, and a sector selector configured to connect the at least one remote RF unit to at least two of the O/E converters of the remote unit and at least two of the E/O converters of the remote unit, wherein the sector selector is configured to dynamically select a downlink RF signal from a corresponding one of the O/E converters of the remote unit and to transmit an adjusted uplink RF signal from the remote RF unit to a corresponding one of the E/O converters of the remote unit.

2. The distributed antenna system of claim 1, wherein at least one of the remote units is configured to process the uplink signals from the mobile stations by adjusting or filtering said uplink signals.

3. The distributed antenna system of claim 1, wherein the wavelength division multiplexer comprises a dense wavelength division multiplexer.

4. The distributed antenna system of claim 1, wherein the wavelength division multiplexer comprises a coarse wavelength division multiplexer.

5. The distributed antenna system of claim 1, wherein the system is configured to transmit a plurality of sectorized signals.

6. The distributed antenna system of claim 1, wherein the system is configured to transmit multiple-input and multiple-output signals.

7. A distributed antenna system comprising:
   a plurality of remote units configured to service different regions of a service area; and
   a head-end unit configured to process and transmit downlink signals from base stations to the remote units over optical cables, and to process and transmit uplink signals from the remote units to the base stations;
   wherein the remote units are configured to adjust or filter a level of downlink signals from the head-end unit and to transmit the adjusted or filtered downlink signals to mobile stations, and to process and transmit uplink signals from mobile stations to the head-end unit over the optical cables;

wherein the downlink signals from the head-end unit are downlink optical signals with multiple wavelengths, wherein each of the remote units comprises:

a wavelength division multiplexer configured to split corresponding downlink optical signals with multiple wavelengths into a plurality of downlink optical signals with different wavelengths and transmit the downlink optical signals with different wavelengths to a plurality of optical paths according to the different wavelengths, and to combine a plurality of uplink optical signals with different wavelengths into an uplink optical signal with multiple wavelengths;

a plurality of O/E converters each configured to convert a corresponding downlink optical signal at one of the different wavelengths into a corresponding downlink RF signal;

at least one remote RF unit configured to adjust a level of the downlink RF signals from at least one of the OIE converters to obtain a predefined service coverage, and to adjust a level of uplink RF signals received from corresponding mobile stations; and a plurality of E/O converters each configured to receive adjusted uplink RF signals from the remote RF unit, and to convert the adjusted uplink RF signals into one a corresponding one of the plurality of uplink optical signals to be transmitted to the wavelength division multiplexer; and wherein at least one of the remote units further comprises a sector selector configured to connect one of the remote RF units to at least two of the O/E converters and at least two of the E/O converters, the sector selector configured to dynamically select one of the downlink RF signals from a corresponding one of the O/E converters and to transmit one of the adjusted uplink RF signals from the remote RF unit to a corresponding one of the E/O converters.

8. The distributed antenna system of claim 7, wherein the head-end unit is configured to process the downlink signals from the base stations by adjusting or filtering said downlink signals and is configured to process the uplink signals from the remote units by adjusting or filtering said uplink signals.

9. The distributed antenna system of claim 7, wherein at least one of the remote units is further configured to filter the uplink signals from the mobile stations.

10. The distributed antenna system of claim 7, wherein the wavelength division multiplexer comprises a dense wavelength division multiplexer.

11. The distributed antenna system of claim 7, wherein the wavelength division multiplexer comprises a coarse wavelength division multiplexer.

12. The distributed antenna system of claim 7, wherein the wavelength division multiplexer of each of the remote units is configured to receive the optical signals with multiple wavelengths via a single corresponding optical cable.

13. The distributed antenna system of claim 7, wherein the sector selector comprises a downlink RF switch and an uplink RF switch.

14. The distributed antenna system of claim 7, wherein the remote RF unit is further configured to filter out-band spurious signals via a duplexer filter.

15. The distributed antenna system of claim 7, wherein the system is configured to transmit a plurality of sectorized signals.

16. The distributed antenna system of claim 7, wherein the system is configured to transmit multiple-input and multiple-output signals.

* * * * *